US011281802B2

(12) United States Patent
Kane et al.

(10) Patent No.: US 11,281,802 B2
(45) Date of Patent: Mar. 22, 2022

(54) PROVIDING OBFUSCATED USER IDENTIFIERS FOR MANAGING USER-SPECIFIC APPLICATION STATE ON MULTIUSER DEVICES

(71) Applicant: Apple Inc., Cupertino, CA (US)

(72) Inventors: Christopher J. Kane, San Jose, CA (US); Vijay Sundaram, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 165 days.

(21) Appl. No.: 16/664,670

(22) Filed: Oct. 25, 2019

(65) Prior Publication Data

US 2020/0380166 A1 Dec. 3, 2020

Related U.S. Application Data

(60) Provisional application No. 62/855,847, filed on May 31, 2019.

(51) Int. Cl.
*G06F 21/62* (2013.01)
(52) U.S. Cl.
CPC ................ *G06F 21/6254* (2013.01)
(58) Field of Classification Search
CPC .................................................. G06F 21/6254
See application file for complete search history.

(56) References Cited

U.S. PATENT DOCUMENTS 9,363,238 B2 * 6/2016 Turner ................ G06F 21/6263
10,764,752 B1 * 9/2020 Avetisov ............... H04L 63/062
2013/0332987 A1 * 12/2013 Tenneti .................... H04L 63/10
  726/1
2014/0279990 A1 * 9/2014 Okumura .............. G06F 21/335
  707/705
2015/0180846 A1 * 6/2015 Nguyen .................. H04L 67/34
  726/7
2015/0379303 A1 * 12/2015 LaFever .............. G06F 21/6254
  726/28
2016/0283745 A1 * 9/2016 LaFever .............. G06F 21/6254
2017/0243162 A1 * 8/2017 Gavrielides ........... G06F 16/273
2018/0307859 A1 * 10/2018 LaFever ................ G16H 10/60
2019/0332807 A1 * 10/2019 LaFever .............. G06F 21/6254
2020/0067907 A1 * 2/2020 Avetisov ............... H04L 9/3218

(Continued)

OTHER PUBLICATIONS

International Search Report and Written Opinion from PCT/US2020/028348, dated July 23, 2020, 14 pages.

*Primary Examiner* — Joseph P Hirl
*Assistant Examiner* — Stephen T Gundry
(74) *Attorney, Agent, or Firm* — Morgan, Lewis & Bockius LLP

(57) ABSTRACT

A device implementing a system for associating a profile with an active user account includes a processor configured to receive, from an application running on a device, a request to identify an active user account on the device. The processor is further configured to generate, in response to the request, a unique identifier corresponding to the active user account on the device, the unique identifier being distinct from a user account identifier of the active user account. In addition, the processor is configured to provide the unique identifier to the application for differentiation, by the application, of the active user account on the device relative to at least one other account on the device.

21 Claims, 5 Drawing Sheets

(56) References Cited

U.S. PATENT DOCUMENTS

| | | | |
|---|---|---|---|
| 2020/0186504 A1* | 6/2020 | Glassco | G06F 9/45558 |
| 2020/0380510 A1* | 12/2020 | Hare | G06Q 20/10 |
| 2020/0380983 A1* | 12/2020 | Sundaram | G10L 15/26 |
| 2020/0380996 A1* | 12/2020 | Alsina | H04L 65/4084 |
| 2020/0382513 A1* | 12/2020 | Biswas | H04L 67/306 |
| 2020/0382517 A1* | 12/2020 | Alsina | H04L 63/102 |
| 2020/0382927 A1* | 12/2020 | Leduc | H04W 8/183 |
| 2021/0029133 A1* | 1/2021 | Holmes, II | G06Q 20/1235 |
| 2021/0044976 A1* | 2/2021 | Avetisov | H04L 9/3218 |
| 2021/0124772 A1* | 4/2021 | Jorgensen | G06F 16/639 |

* cited by examiner

PROVIDING OBFUSCATED USER IDENTIFIERS FOR MANAGING USER-SPECIFIC APPLICATION STATE ON MULTIUSER DEVICES

CROSS REFERENCE TO RELATED APPLICATIONS

This application claims the benefit of priority to U.S. Provisional Patent Application No. 62/855,847, entitled "Providing Obfuscated User Identifiers for Managing User-Specific Application State on Multi-User Devices," and filed on May 31, 2019, the disclosure of which is hereby incorporated herein in its entirety.

TECHNICAL FIELD

The present description relates generally to managing application state on multi-user devices, including providing obfuscated user identifiers for managing per-user application state on multi-user devices.

BACKGROUND

An operating system of a multi-user device may allow users to switch between different user accounts on the device. Different applications may be installed on the multi-user device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
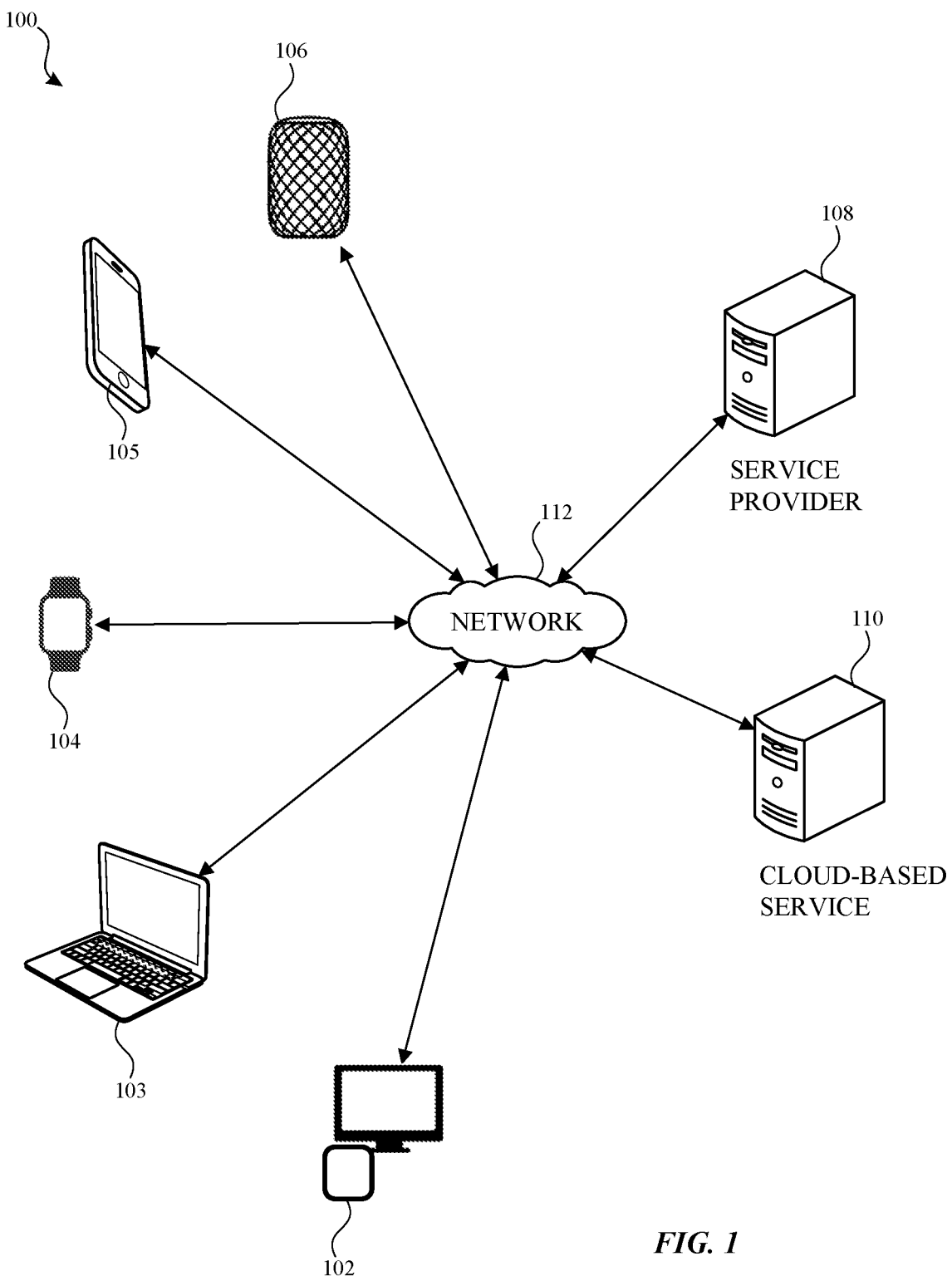
FIG. 1 illustrates an example network environment in which a multi-user device may provide obfuscated user identifiers for managing user-specific application state in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

An operating system of a multi-user device may allow users to switch between different user accounts on the device. The user accounts may be associated with different content libraries, viewing histories, and the like, which may each change on the device in response to changing the active user account. However, the user accounts may share the same application data for applications on the multi-user device that do not have sufficient privileges/trust with the operating system (e.g., third party applications), and the operating system may not inform the third party applications of the active user account on the multi-user device, e.g., to preserve user privacy. Thus, a third party application running on the multi-user device may not be able to associate monitored or tracked user activity within the third party application back to a particular user account on the multi-device, and/or another entity may not be able to aggregate user activity across third party applications back to a particular user account on the multi-user device.

Although this paradigm may preserve user privacy, a third party application that supports different user profiles or different user accounts may be rendered incapable of managing user-specific (e.g., per-user) application state, e.g., since the user accounts share the same application data for the third party applications and since the third party applications are not informed of the active user account on the multi-user device. For example, a third party application may be unable to associate a selected user account/profile with the active user account on the multi-user device, e.g., to establish a default user account/profile in the third-party application for the active user account. Thus, a user accessing such a third party application may need to select/identify their particular user profile/account each time the third party application is launched, and/or each time the active user account is changed on the multi-user device.

The subject system allows third party applications to manage user-specific application state by providing the third party applications with an obfuscated user identifier corresponding to the active user account on a multi-user device. The third party applications may then associate the obfuscated user identifier with a particular user account or user profile within each respective third party application, such as a user account/profile selected by the current user.

For example, a user of a multi-user device may launch a third party application that supports multiple user accounts/profiles and may select a particular user account/profile. The third party application may request that the operating system of the multi-user device identify the active user account, and the operating system may provide the third party application with an obfuscated user identifier, such as a pseudorandom number, corresponding to the active user account. The third party application may then store an association between the selected user account/profile and the obfuscated user identifier. The next time the user launches the third party application, the third party application may again request that the operating system identify the active user account and the operating system may provide the same obfuscated user identifier, e.g., the same pseudorandom number. The third party application can then automatically, and without user input, identify and select the user account/profile that was previously selected by the user, e.g., based on the stored association with the obfuscated user identifier.

In this manner, third party applications are provided with a mechanism for managing user-specific application state on a multi-user device without comprising the privacy of the user accounts on the multi-user device. Further in this regard, the operating system of the multi-user device may provide different obfuscated user identifiers to each third party application for a given user account. Thus, user activity across the third party applications for a particular user account cannot be aggregated back to the particular user account (even though the particular user account would still be unidentifiable nonetheless). In addition, the operating system of the multi-user device may provide users with the option to reset their obfuscated identifiers at any time, which would be transparent to the third-party applications, thereby further ensuring that user privacy is preserved.

FIG. 1 illustrates an example network environment 100 in which a multi-user device may provide obfuscated user identifiers for managing user-specific application state in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, 104, 105 and 106 (hereinafter "the electronic devices 102-106"), a service provider 108, a cloud-based service 110 (hereinafter "the servers 108-110") and a network 112. The network 112 may communicatively (directly or indirectly) couple, for example, any two or more of the electronic devices 102-106 with the service provider 108 and/or the cloud-based service. In one or more implementations, the network 112 may be an interconnected network of devices that may include, and/or may be communicatively coupled to, the Internet. For explanatory purposes, the network environment 100 is illustrated in FIG. 1 as including electronic devices 102-106, a single service provider 108 and a single cloud-based service 110; however, the network environment 100 may include any number of electronic devices and any number of servers.

One or more of the electronic devices 102-106 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. By way of example, the electronic device 102 is depicted as a digital media player (e.g., configured to receive digital data such as music and/or video and stream it to a display device such as a television or other video display). In one or more implementations, the electronic device 102 may be integrated into the display device. By way of example, the electronic device 103 is depicted as a laptop computer, the electronic device 104 is depicted as a smartwatch, the electronic device 105 is depicted as a smartphone, and the electronic device 106 is depicted as a smart speaker. Each of the electronic devices 102-106 may be, and/or may include all or part of, the device discussed below with respect to FIG. 2, and/or the electronic system discussed below with respect to FIG. 5.

One or more of the electronic devices 102-106 may implement an operating system configured to provide an application (e.g., a third party application) running on the device with a obfuscated user identifier, e.g., a unique identifier, corresponding to an active user account. The unique identifier may obfuscate user account information (e.g., a user account identifier associated with the cloud-based service 110), and be usable by the third party application to associate an existing or new profile (e.g., for user preferences and/or recommended content) with the active user account.

In one or more implementations, the service provider 108 may be configured to provide content (e.g., media content and/or other type(s) of content) to an application (e.g., a third party application) running on a device (e.g., one or more of the electronic devices 102-106). In one or more implementations, the cloud-based service 110 may be configured to perform operations in association with user accounts such as: storing data (e.g., files such as documents and/or photos) with respect to a user account, sharing and/or sending data with other users with respect to a user account, backing up device data with respect to a user account, and/or associating devices and/or groups of devices (e.g., within a home) with user accounts.

One or more of the servers 108-110 may be, and/or may include all or part of the electronic system discussed below with respect to FIG. 5. Each of the servers 108-110 may include one or more servers, such as a cloud of servers. For explanatory purposes, a single server is shown and discussed with respect to various operations for each of the servers 108-110. However, these and other operations discussed herein may be performed by one or more servers, and each different operation may be performed by the same or different servers.

Figure 2:
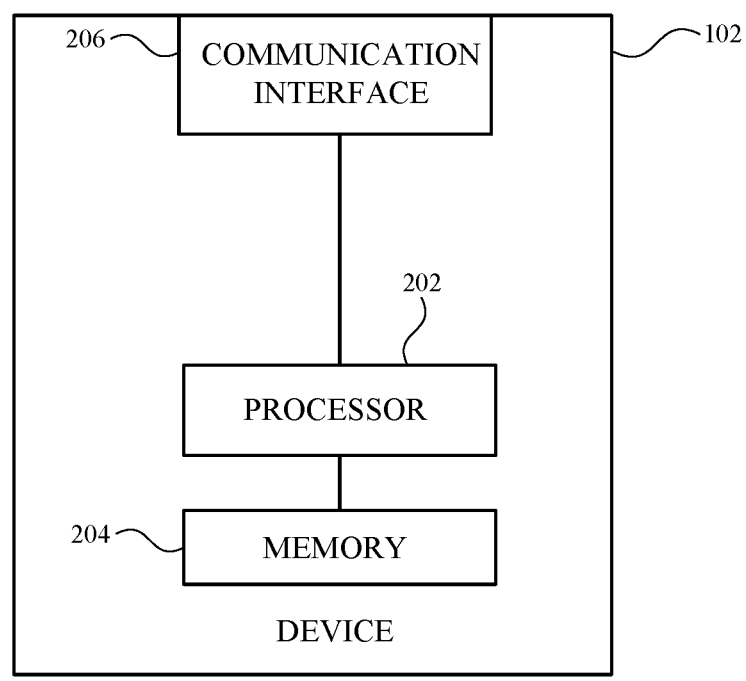
FIG. 2 illustrates an example multi-user device that may implement a system that provides obfuscated user identifiers for managing user-specific application state in accordance with one or more implementations.

FIG. 2 illustrates an example device 102 that may implement a system that provides for associating a profile with an active user account in accordance with one or more implementations. For explanatory purposes, FIG. 2 is primarily described herein with reference to the electronic device 102. However, FIG. 2 may correspond to any of the electronic devices 102-106 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a processor 202, a memory 204, and a communication interface 206. The processor 202 may include suitable logic, circuitry, and/or code that enable processing data and/or controlling operations of the electronic device 102. In this regard, the processor 202 may be enabled to provide control signals to various other components of the electronic device 102. The processor 202 may also control transfers of data between various portions of the electronic device 102. Additionally, the processor 202 may enable implementation of an operating system or otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, the memory 204 may store code corresponding to one or more applications (e.g., one or more third party applications), such as a third party application configured to provide content (e.g., media content such as audio/video, game content, weather, news, web-based content, social networking content and/or the like) to a user of the electronic device 102. The memory 204 may further store logic (e.g., within the operating system) to generate a unique identifier corresponding to an active user account on the electronic device 102, and to provide the unique identifier to the application.

The communication interface 206 may include suitable logic, circuitry, and/or code that enables wired or wireless communication, such as between any of the electronic devices 102-106 and the service provider 108 and/or the cloud-based service 110 over the network 112. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
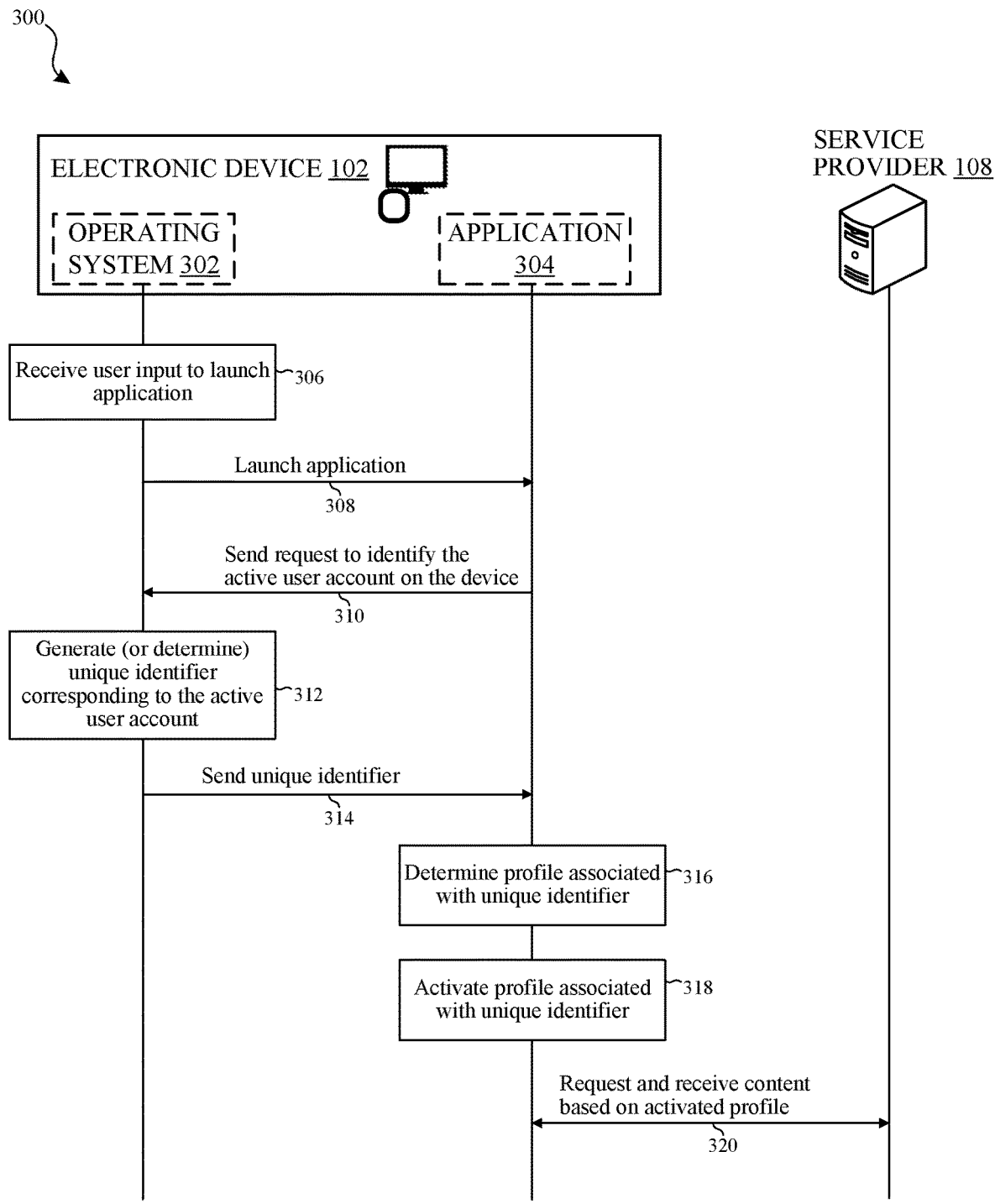
FIG. 3 illustrates an example process for generating obfuscated user identifiers usable by an application to manage user-specific application state in accordance with one or more implementations.

FIG. 3 illustrates an example process 300 for generating obfuscated user identifiers usable by an application to manage user-specific application state in accordance with one or more implementations. For explanatory purposes, the process 300 is primarily described herein with reference to the electronic device 102 and the service provider 108 of FIG. 1. However, the process 300 is not limited to the electronic device 102 and the service provider 108 of FIG. 1, and one or more blocks (or operations) of the process 300 may be performed by one or more other components and/or other suitable devices (e.g., any of the electronic devices 102-106). Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

As seen in FIG. 3, the electronic device 102 (e.g., a multi-user digital media player) may include an operating system 302 and an application 304. The electronic device 102 may include application(s) that have a certain trust level and/or have certain privileges with the operating system 302, such as applications signed by the same entity as the operating system. In addition, the electronic device 102 may include third party applications (e.g., the application 304) that do not have the certain trust level and/or do not have the certain privileges with the operating system 302, such as applications signed by a different entity than the operating system.

The application 304 may be configured to provide different services. In one or more implementations, the application 304 may provide for the output of content (e.g., media content such as audio/video, game content, weather, news, web-based content, social networking content and/or the like) on the electronic device 102. For example, the application 304 may be configured to output content that is streamed and/or downloaded (e.g., from the service provider 108) for output on the electronic device 102. In one or more implementations, the application 304 and/or the service provider 108 may correspond to a third party service.

The operating system 302 of the electronic device 102 may provide different control mechanisms for navigating within the operating system and/or the application 304. For example, a user may use his/her personal device (e.g., one of the electronic devices 103-105) as a remote control in order to navigate the application 304 and output content (e.g., media content streamed from the service provider 108) on the electronic device 102. The personal device (e.g., one of the electronic devices 103-105) and the electronic device 102 may be connected to the same local area network.

In one more implementations, the personal device (e.g., one of the electronic devices 103-105) may perform such remote control operations on the electronic device 102 via an application such as, but not limited to: a remote control application configured to provide for remote control of another device; a control application configured to provide direct access to predefined settings for the personal device, including remote control of another device; and/or a virtual assistant application (e.g., running on the personal device) configured to use voice queries and a natural-language user interface to perform actions, such as remote control actions, by delegating requests to a set of services (e.g., Internet services and/or services within a local area network).

Alternatively or in addition, the user may navigate the operating system 302 and/or the application 304 of the electronic device 102 without being required to use a personal device (e.g., one of the electronic devices 103-105). For example, the electronic device 102 (e.g., multi-user digital media player) may be connected to the same local area network as the electronic device 106 (e.g., a smart speaker associated with a home account of a user, but not configured as a personal device), and the electronic device 106 may include a virtual assistant application. Thus, the user may provide a voice commands to the electronic device 106, where the voice queries instruct the electronic device 102 to perform a particular action, such as output content. Alternatively or in addition, the electronic device 102 (e.g., multi-user digital media player) may have a separate remote control device (not shown) that is usable to output content on the electronic device 102.

In one or more implementations, the operating system 302 may provide a user interface (e.g., which can be navigated via one or more of the above-mentioned control mechanisms) for switching between user accounts. In one or more implementations, the user accounts may be associated with a cloud-based service (e.g., the cloud-based service 110). In one or more implementations, the operating system 302 may include application(s) configured to use the cloud-based service 110 in order to perform operations such as, but not limited to, storing data (e.g., files such as documents and/or photos) with respect to a user account, sharing and/or sending data with other users with respect to a user account, backing up device data with respect to a user account, and/or associating devices and/or groups of devices (e.g., within a home) with a user account. Such applications may have a trust level and/or privileges with the operating system for accessing account information (e.g., user account identifiers), for example, that may be used to obtain viewing history and other content related to user accounts.

However, the electronic device 102 may include other applications (e.g., the application 304) that do not have the same trust level and/or privileges with the operating system 302. To preserve user privacy, in one or more implementations, the operating system 302 may be configured not to share user account information (e.g., a user account identifier of the active user account) with such applications (e.g., third party applications).

As noted above, in one or more implementations, the application 304 may provide for the output of content (e.g., media content). For example, the application 304 may provide a user interface of available content (e.g., a list of movies, shows or other content), which is selectable by the user for output on the electronic device 102. In providing available content, the application 304 may implement profiles, which allow users to have a personalized experience with recommended content and/or user preferences. For example, a "horror" profile may include recommendations directed to horror content, a "comedy" profile may include recommendations directed to comedy content, a "kids" profile may include recommendations directed to content for children, and the like.

Upon launching, the application 304 may typically present a user with a user interface by which the user can select a profile (e.g., from the available profiles) for content recommendations and/or user preferences. It may be desirable for the application 304 to automatically, and without user input, select a profile, such that the user is not always required to manually select a profile at application launch.

However, as noted above, the application 304 may not be provided with user account information (e.g., the user account identifiers for cloud-based services). Thus, the operating system 302 may be configured to generate (and maintain) unique identifiers for providing to the application 304, so that the application 304 may associate user profiles (e.g., including user preferences and/or recommended content) with user accounts, while maintaining user privacy.

At operation 306, the operating system 302 receives user input to launch the application. For example, the operating system 302 may display available applications (e.g., operating system applications and/or third party applications) as separate graphical elements (e.g., icons), and the user may select a graphical element corresponding to the application 304. At operation 308, the operating system launches the application 304.

At operation 310, the application 304 sends, to the operating system, a request to identify the active user account on the electronic device 102. The operating system 302 may be configured to determine a user account that is the active user account. For example, upon start-up of the electronic device 102, the operating system 302 may determine that the active user account is the most recent user account used before the last shutdown (e.g., based on storing and retrieving this value from the memory 204 of the electronic device 102). In another example, the operating system 302 may detect a current user account based on a switch to a different active user account (e.g., using the above-mentioned user interface for switching between user accounts).

At operation 312, the operating system 302 generates (or determines) a unique identifier corresponding to the active user account on the electronic device 102. In one or more implementations, the unique identifier may be usable by the application 304 for differentiation of the active user account with respect to other user accounts associated with the electronic device 102.

Initially, the operating system 302 may determine whether a unique identifier corresponding to the active user account for the particular application is already stored in memory (e.g., the memory 204) of the electronic device 102. For example, this may occur based on the electronic device 102 having previously generated a unique identifier for the active user account.

In a case a unique identifier is not stored in the memory 204 of the electronic device 102, the operating system 302 may be configured to derive the unique identifier from the user account identifier (e.g., corresponding to the cloud-based service 110) of the active user account. Deriving the unique identifier may be based on a hash function, such that the account identifier us indeterminable from the unique identifier. The operating system 302 may then store, in the memory 204, the generated unique identifier in association with the active user account (e.g., for future look-up if a unique identifier is already stored in memory).

In one or more implementations, the operating system 302 performs the hash operation based on one or more of: the user account identifier (e.g., corresponding to the cloud-based service 110) of the active user account; an application identifier corresponding to the application 304 (e.g., based on the name of the application 304, an application ID from an on-line store for downloading the application 304, and/or other identifying information of the application 304); a home identifier (e.g., corresponding to a home account associated with the electronic device 102); and/or a salt value (e.g., stored in the cloud-based service 110, in association with a user account corresponding to the owner of the home).

By virtue of generating (and maintaining) the unique identifier in this manner, it is possible for the operating system 302 of the electronic device 102 to distinguish the active user account from other user accounts on the electronic device 102 while preserving privacy of the user account information (e.g., the user account identifier). In one or more implementations, it is possible that electronic device 102 (e.g., digital media player) is one of multiple digital media players included in a home. The respective operating systems of the other digital media player(s) may be configured to generate the same unique identifier for the active user account, for example, by performing the hash operation based on the same one or more of the user account identifier, the application identifier, the home identifier, and/or a salt value (e.g., which is stored and may be retrieved from the cloud-based user account corresponding to an owner of the home account).

At operation 314, the operating system 302 sends the unique identifier to the application 304, and at operation 316, the application 304 determines a profile associated with the unique identifier. In one or more implementations, the application 304 is configured to determine if a profile is already associated with the unique identifier. For example, the application 304 may store (e.g., in the memory 204 of the electronic device 102) a data structure which maps unique identifiers (e.g., as previously provided by the operating system 302) to respective profiles, where the profiles are identified by respective profile identifiers. In one or more implementations, the data structure is implemented as a look-up table of known unique identifiers and their respective profile identifier values. Thus, the application 304 may determine that the unique identifier provided by the operating system at operation 314 is mapped to a profile (e.g., per the data structure).

Alternatively, the application 304 may determine, from the data structure, that the unique identifier is not mapped to a profile. In such a case, the application 304 may provide a user interface on the electronic device 102, prompting the user (e.g., of the active user account) to select a profile to associate with the active user account, and/or to select that no profile is to be associated with the active user account. For example, the user interface may display a list of all available profiles (e.g., "horror," "comedy," "kids" and the like), each of which have respective profile identifiers. In response to user selection of one of the listed profiles, the application 304 may associate the corresponding profile identifier with the unique identifier, for example, by updating the data structure to include an entry which maps unique identifier to the profile identifier (e.g., or to no profile identifier, if the user selected no profile).

In one or more implementations, the application 304 may not support user-selectable profiles. However, nonetheless, the application 304 may use the unique identifier to create/manage a profile for the active user account. The profile may include, for example, user preferences, user history, and/or other user-specific application state information.

At operation 318, the application 304 activates the profile (e.g., as identified by the profile identifier) associated with the unique identifier. For example, the application 304 may determine recommended content and/or user preferences associated with the profile, using logic based on parameters such as viewing history, selected viewing preferences and the like. The logic for determining the recommended content and/or preferences may be performed locally with respect to the electronic device 102, remotely with respect to the service provider 108, or a combination of both local and remote logic. At operation 320, the application 304 may request and receive recommendations for content, user preferences and/or the content (e.g., media content) itself from the service provider 108 based on the activated profile. In one or more implementations, the application 304 may output content that is streamed from the service provider 108. Alternatively or in addition, the application 304 may output content that is downloaded from the service provider 108 and stored in local memory (e.g., the memory 204) of the electronic device 102 for playback.

In one or more implementations, the operating system 302 may detect a change from the active user account to another user account while the application 304 is still running (e.g., in either the background or the foreground of the electronic device 102). For example, such a change may be effected by the above-described user interface which provides for a user to switch between user accounts at the operating system level. As such, the newly-selected account becomes the active user account while the application 304 is still running.

In response to detecting the change, the operating system 302 may generate (or determine) a second unique identifier corresponding to the newly-selected active user account (similar to operation 312) and send the second unique identifier to the application 304 (similar to operation 314). In addition, the application 304 may automatically, and without user input, determine a profile associated with the second unique identifier (similar to operation 316), activate the user profile associated with the second unique identifier (similar to operation 318) and request and receive content based on the activated profile (similar to operation 320).

In one or more implementations, the operating system may be configured to generate (and maintain) unique identifiers with respect to a user account, on a per-application basis. As such, different applications may be provided (e.g., by the operating system 302) with different unique identifiers in association with the same user account. In this manner, user account information such as viewing history, user preferences, recommended content and the like may not be shared between applications (and/or their corresponding service providers) based on unique identifiers that are shared between the applications. Thus, operations similar to operations 306 to 320 may be performed with respect to application(s) (e.g., third party application(s)) other than the application 304, with respective unique identifiers being generated (and or determined) for each application.

While the example of FIG. 3 describes that the application 304 provides for the output of content (e.g., media content such as audio/video, game content, weather, news, web-based content and/or social networking content), the subject system is not limited to this type of content. For example, the application 304 may relate to providing services and/or content such as, but not limited to: books, business, catalogs, education, entertainment, finance, food & drink, games, health & fitness, lifestyle, medical, music, navigation, news, photo & video, productivity, reference, social networking, sports, travel, utilities and weather. With respect to the different types of services, the application 304 may be able to differentiate the active user account on the device relative to at least one other user account on the device as described herein, for example, to provide service and/or content for a personalized user experience.

Figure 4:
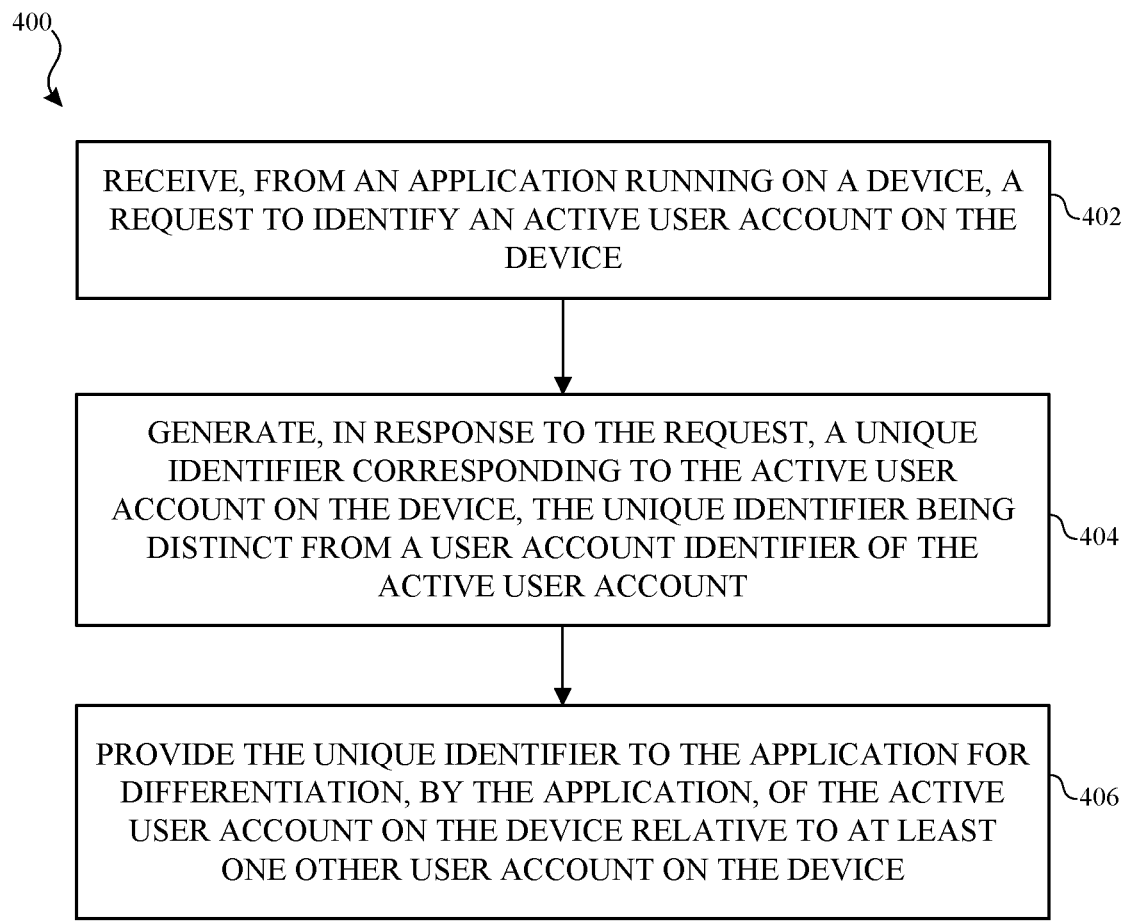
FIG. 4 illustrates a flow diagram of generating obfuscated user identifiers usable by an application to manage user-specific application state in accordance with one or more implementations.

FIG. 4 illustrates a flow diagram of providing information corresponding to a user in association with messaging in accordance with one or more implementations. For explanatory purposes, the process 400 is primarily described herein with reference to the electronic device 102 and the service provider 108 of FIG. 1. However, the process 400 is not limited to the electronic device 102 and the service provider 108 of FIG. 1, and one or more blocks (or operations) of the process 400 may be performed by one or more other components of the service provider 108 and other suitable devices (e.g., any of the electronic devices 102-106). Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The electronic device 102 receives, from an application running on the electronic device 102, a request to identify an active user account on the electronic device 102 (402). The electronic device 102 generates, in response to the request, a unique identifier corresponding to the active user account on the electronic device 102, the unique identifier being distinct from a user account identifier of the active user account (404).

The unique identifier may be derived from the user account identifier of the active user account. The user account identifier may be indeterminable from the unique identifier. The unique identifier may be further derived from at least one of an application identifier of the application, a home account identifier associated with a home account of the electronic device 102, or a salt value stored in cloud-based storage associated with the active user account.

The electronic device 102 provides the unique identifier to the application for differentiation, by the application, of the active user account with respect to other user accounts associated with the electronic device 102 (406).

In one or more implementations, the electronic device 102 may detect a change to a second active user account on the electronic device 102 while the application is running on the electronic device 102. The electronic device 102 may generate a second unique identifier corresponding to the second active user account on the electronic device 102, the second unique identifier being distinct from a user account identifier of the second active user account. The electronic device 102 may provide the second unique identifier to notify the application of the change to the second active user account on the electronic device 102.

In one or more implementations, the electronic device 102 may receive, from a second application running on the electronic device 102, a request to identify the active user account on the electronic device 102. The electronic device 102 may generate, in response to the request, a second unique identifier corresponding to the active user account on the electronic device 102, the second unique identifier being distinct from the unique identifier and from the user account identifier of the active user account. The electronic device 102 may provide the second unique identifier to the second application for differentiation, by the second application, of the active user account on the electronic device 102 relative to at least one other user account on the electronic device 102.

In one or more implementations, the application running on the electronic device 102 may receive the unique identifier, and receive a selection of one of a plurality of profiles utilized by the application. The application may associate the unique identifier with the selected one of the plurality of profiles. Alternatively or in addition, the application running on the electronic device 102 may receive the unique identifier, and determine that the unique identifier was previously associated with one of a plurality of profiles utilized by the application. The application may activate, in response to receipt of the unique identifier and without user input, the one of the plurality of profiles.

As described above, one aspect of the present technology is the gathering and use of data available from specific and legitimate sources for associating a profile with an active user account. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for associating a profile with an active user account. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of associating a profile with an active user account, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 5:
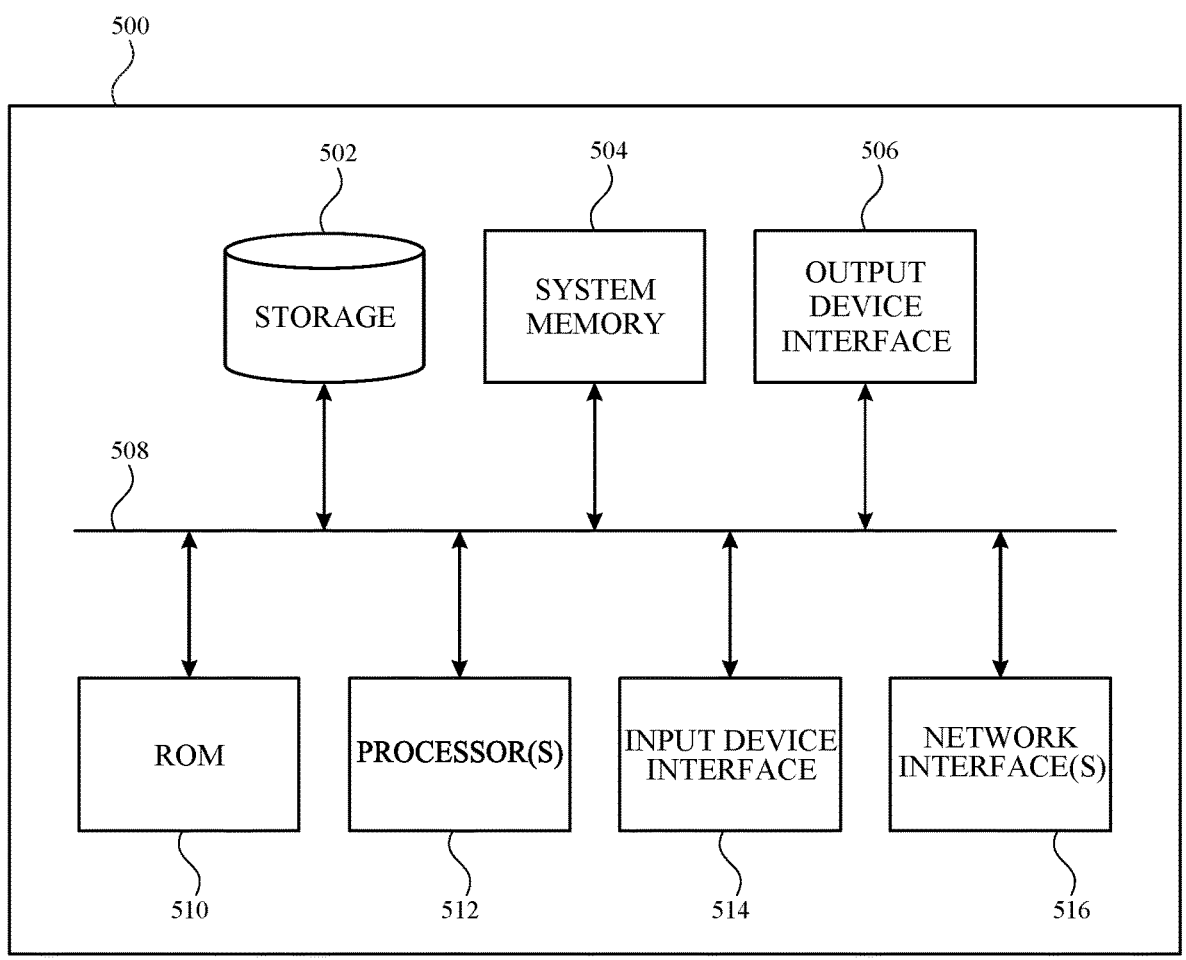
FIG. 5 illustrates an example electronic system with which aspects of the subject technology may be implemented in accordance with one or more implementations.

FIG. 5 illustrates an electronic system 500 with which one or more implementations of the subject technology may be implemented. The electronic system 500 can be, and/or can be a part of, one or more of the electronic devices 102-106, the service provider 108 and/or the cloud-based service 110 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the service provider 108 shown in FIG. 1, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving at an operating system of a device, from an application running on the device, a request to identify an active user account on the device;
   generating, with the operating system of the device in response to the request, a unique identifier corresponding to the active user account on the device, the unique identifier being distinct from a user account identifier of the active user account; and
   providing the unique identifier from the operating system of the device to the application for differentiation, by the application, of the active user account on the device relative to at least one other user account on the device.

2. The method of claim 1, further comprising:
   detecting a change to a second active user account on the device while the application is running on the device;
   generating a second unique identifier corresponding to the second active user account on the device, the second unique identifier being distinct from a user account identifier of the second active user account; and
   providing the second unique identifier to the application to notify the application of the change to the second active user account on the device.

3. The method of claim 1, further comprising:
   receiving, from a second application running on the device, a request to identify the active user account on the device;
   generating, in response to the request, a second unique identifier corresponding to the active user account on the device, the second unique identifier being distinct from the unique identifier and from the user account identifier of the active user account; and providing the second unique identifier to the second application for differentiation, by the second application, of the active user account on the device relative to at least one other user account on the device.

4. The method of claim 1, further comprising:
receiving, by the application, the unique identifier;
receiving, by the application, a selection of one of a plurality of profiles utilized by the application; and
associating the unique identifier with the selected one of the plurality of profiles.

5. The method of claim 1, further comprising:
receiving, by the application, the unique identifier;
determining, by the application, that the unique identifier was previously associated with one of a plurality of profiles utilized by the application; and
activating, in response to receipt of the unique identifier and without user input, the one of the plurality of profiles.

6. The method of claim 1, wherein the unique identifier is derived from the user account identifier of the active user account, and
wherein the user account identifier is indeterminable from the unique identifier.

7. The method of claim 6, wherein the unique identifier is further derived from at least one of an application identifier of the application, a home account identifier associated with a home account of the device, or a salt value stored in cloud-based storage associated with the active user account.

8. The method of claim 1, wherein the application is configured to provide personalized content with respect to the active user account relative to the at least one other user account based on the unique identifier.

9. The method of claim 1, the device having a plurality of user accounts, a currently active one of which is the active user account.

10. A device, comprising:
at least one processor; and
a memory including instructions that, when executed by the at least one processor, cause the at least one processor to:
receive at an operating system of the device, from an application running on the device, a request to identify an active user account on the device;
generate, with the operating system of the device in response to the request, a unique identifier corresponding to the active user account on the device, the unique identifier being distinct from a user account identifier of the active user account; and
provide the unique identifier from the operating system of the device to the application for differentiation, by the application, the active user account on the device relative to at least one other user account on the device.

11. The device of claim 10, the instructions further causing the at least one processor to:
detect a change to a second active user account on the device while the application is running on the device;
generate a second unique identifier corresponding to the second active user account on the device, the second unique identifier being distinct from a user account identifier of the second active user account; and
provide the second unique identifier to the application to notify the application of the change to the second active user account on the device.

12. The device of claim 10, the instructions further causing the at least one processor to:
receive, from a second application running on the device, a request to identify the active user account on the device;
generate, in response to the request, a second unique identifier corresponding to the active user account on the device, the second unique identifier being distinct from the unique identifier and from the user account identifier of the active user account; and
provide the second unique identifier to the second application for differentiation, by the second application, of the active user account on the device relative to at least one other user account on the device.

13. The device of claim 10, wherein the application is configured to:
receive the unique identifier;
receive a selection of one of a plurality of profiles utilized by the application; and
associate the unique identifier with the selected one of the plurality of profiles.

14. The device of claim 10, wherein the application is configured to:
receive the unique identifier;
determine that the unique identifier was previously associated with one of a plurality of profiles utilized by the application; and
activate, in response to receipt of the unique identifier and without user input, the one of the plurality of profiles.

15. The device of claim 10, wherein the unique identifier is derived from the user account identifier of the active user account, and
wherein the user account identifier is indeterminable from the unique identifier.

16. The device of claim 10, wherein the unique identifier is further derived from at least one of an application identifier of the application, a home account identifier associated with a home account of the device, or a salt value stored in cloud-based storage associated with the active user account.

17. The device of claim 10, wherein the application is configured to provide personalized content with respect to the active user account relative to the at least one other user account based on the unique identifier.

18. A computer program product comprising code, stored in a non-transitory computer-readable storage medium, the code comprising:
code to receive at an operating system of a device, from an application running on the device, a request to identify an active user account on the device;
code to generate, with the operating system of the device in response to the request, a unique identifier corresponding to the active user account on the device, the unique identifier being distinct from a user account identifier of the active user account; and
code to provide the unique identifier from the operating system of the device to the application for differentiation, by the application, of the active user account with respect to other user accounts associated with the device.

19. The computer program product of claim 18, the code further comprising:
detecting a change to a second active user account on the device while the application is running on the device;
generating a second unique identifier corresponding to the second active user account on the device, the second unique identifier being distinct from a user account identifier of the second active user account; and providing the second unique identifier to the application to notify the application of the change to the second active user account on the device.

20. The computer program product of claim 18, the code further comprising:
receiving, from a second application running on the device, a request to identify the active user account on the device;
generating, in response to the request, a second unique identifier corresponding to the active user account on the device, the second unique identifier being distinct from the unique identifier and from the user account identifier of the active user account; and
providing the second unique identifier to the second application for differentiation, by the second application, of the active user account on the device relative to at least one other user account on the device.

21. The computer program product of claim 18, the code further comprising:
receiving, by the application, the unique identifier;
receiving, by the application, a selection of one of a plurality of profiles utilized by the application; and
associating the unique identifier with the selected one of the plurality of profiles.

* * * * *